March 17, 1964 R. C. TRINGALI 3,125,048
ADJUSTABLE TRIMMING MECHANISM
Filed Aug. 1, 1960 6 Sheets-Sheet 1

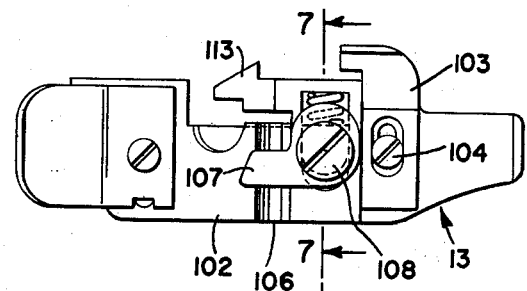
FIG.4
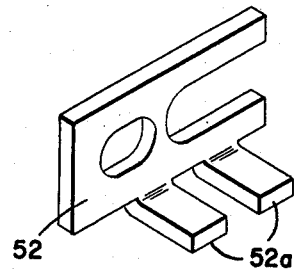
FIG.3
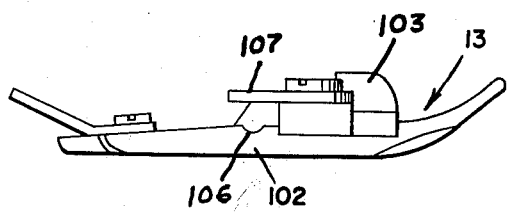
FIG.5
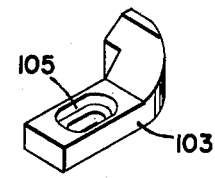
FIG.6
FIG.7 FIG.8
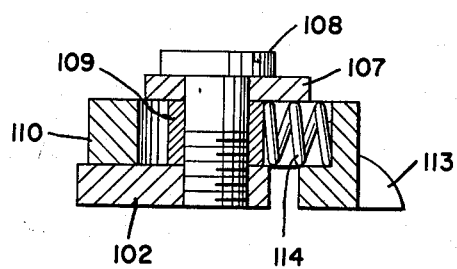
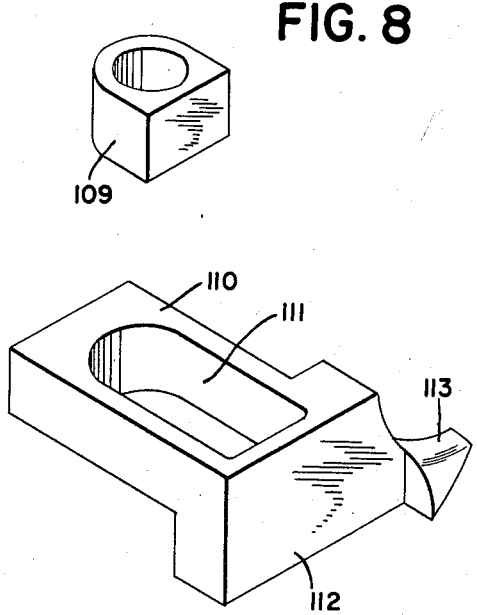
FIG.9

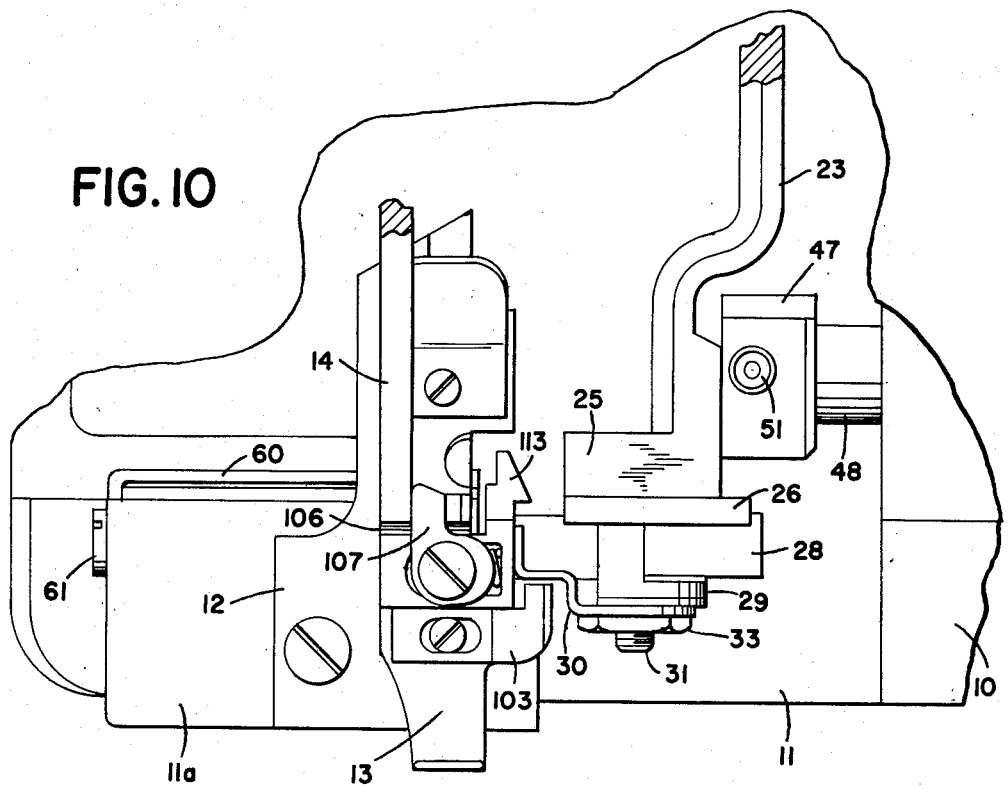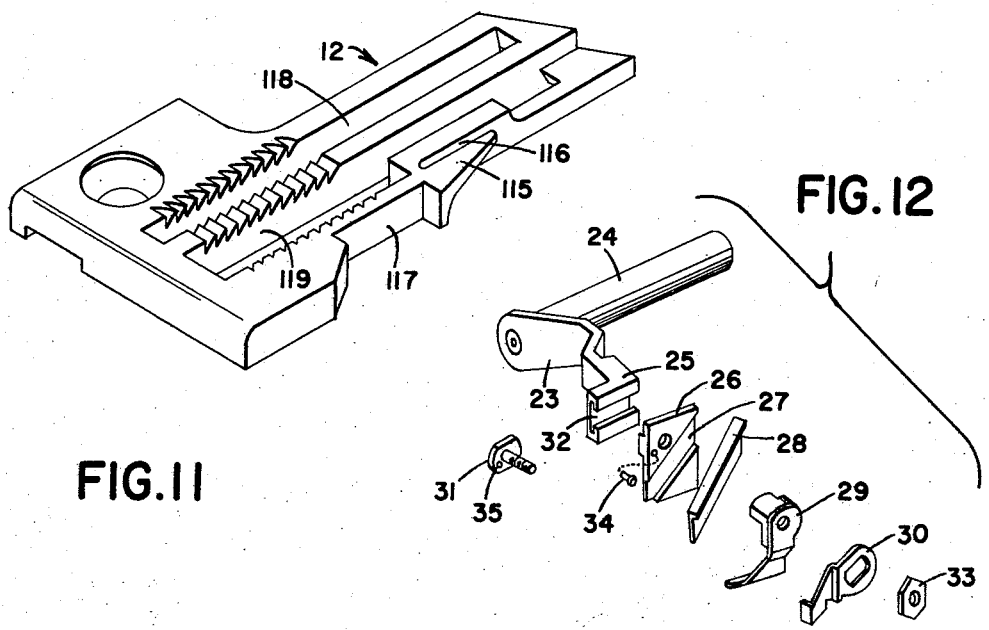

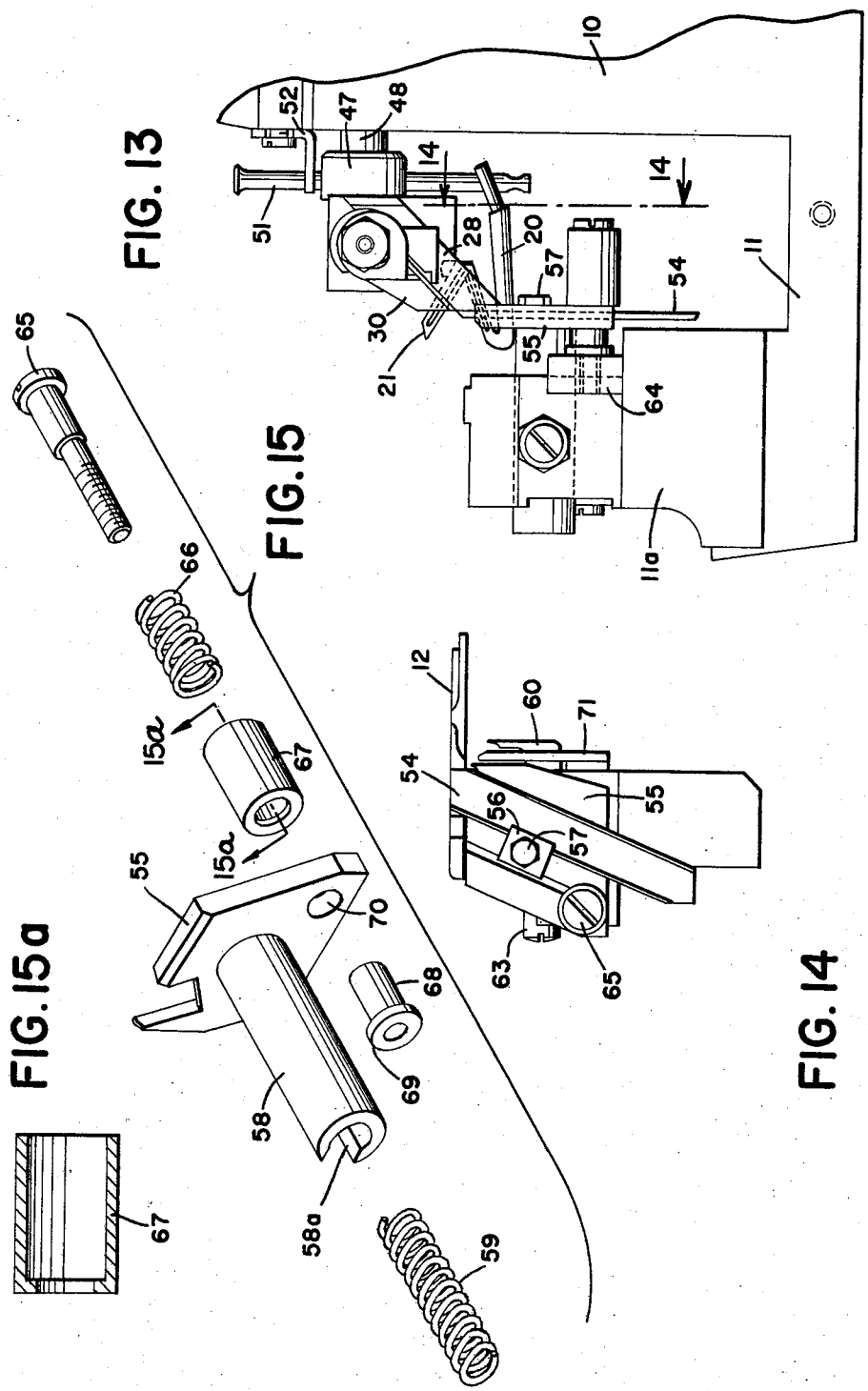

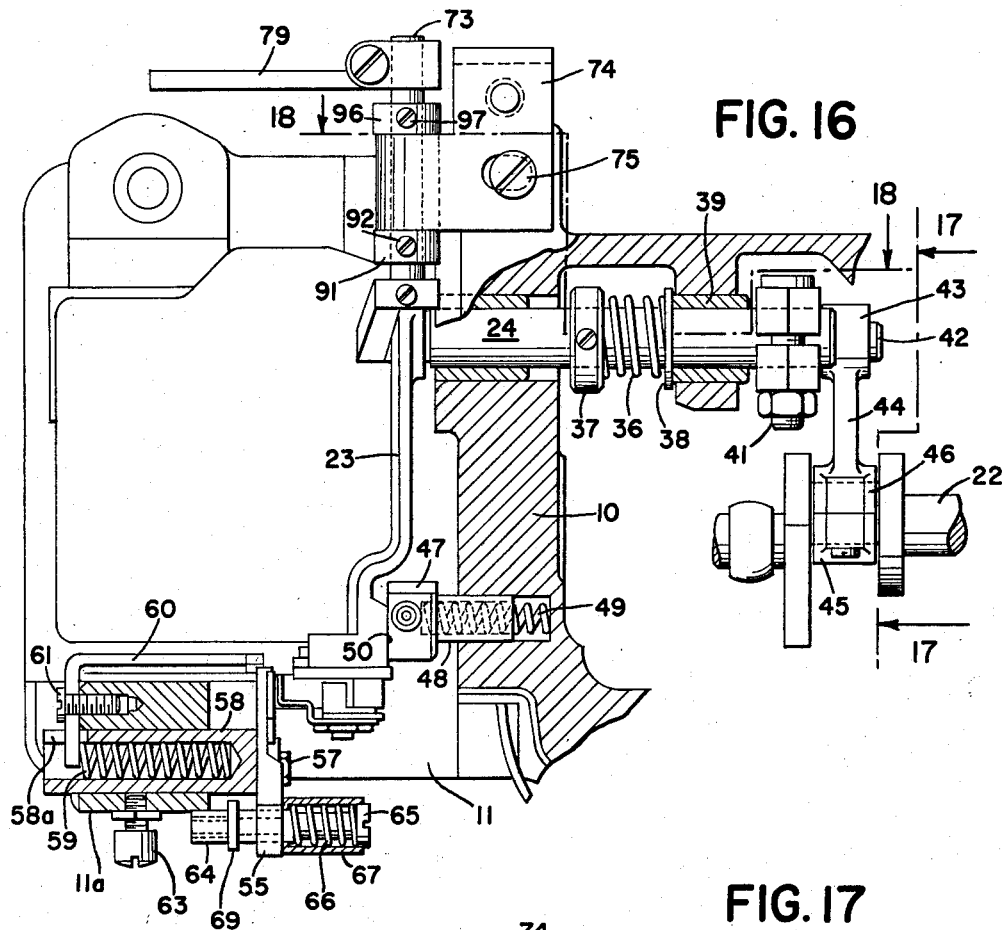
FIG. 16
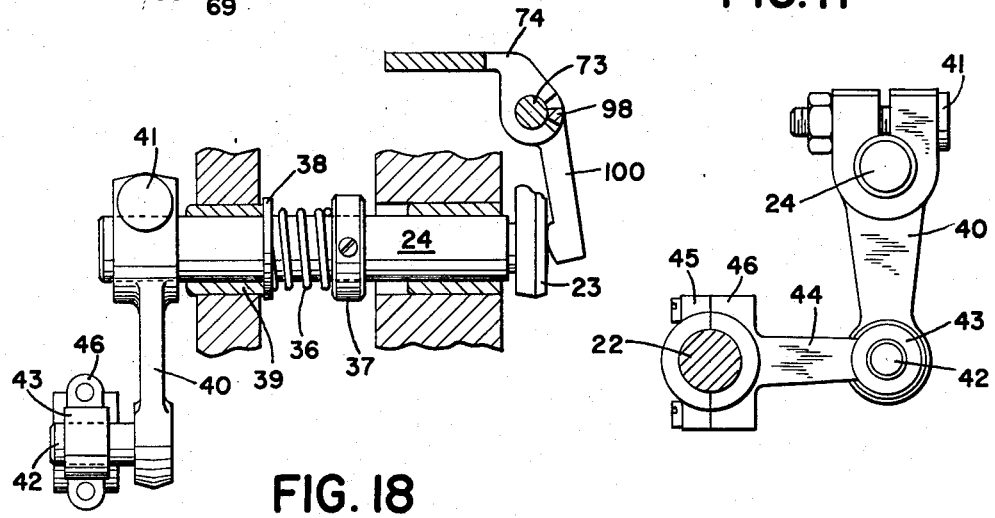
FIG. 17
FIG. 18

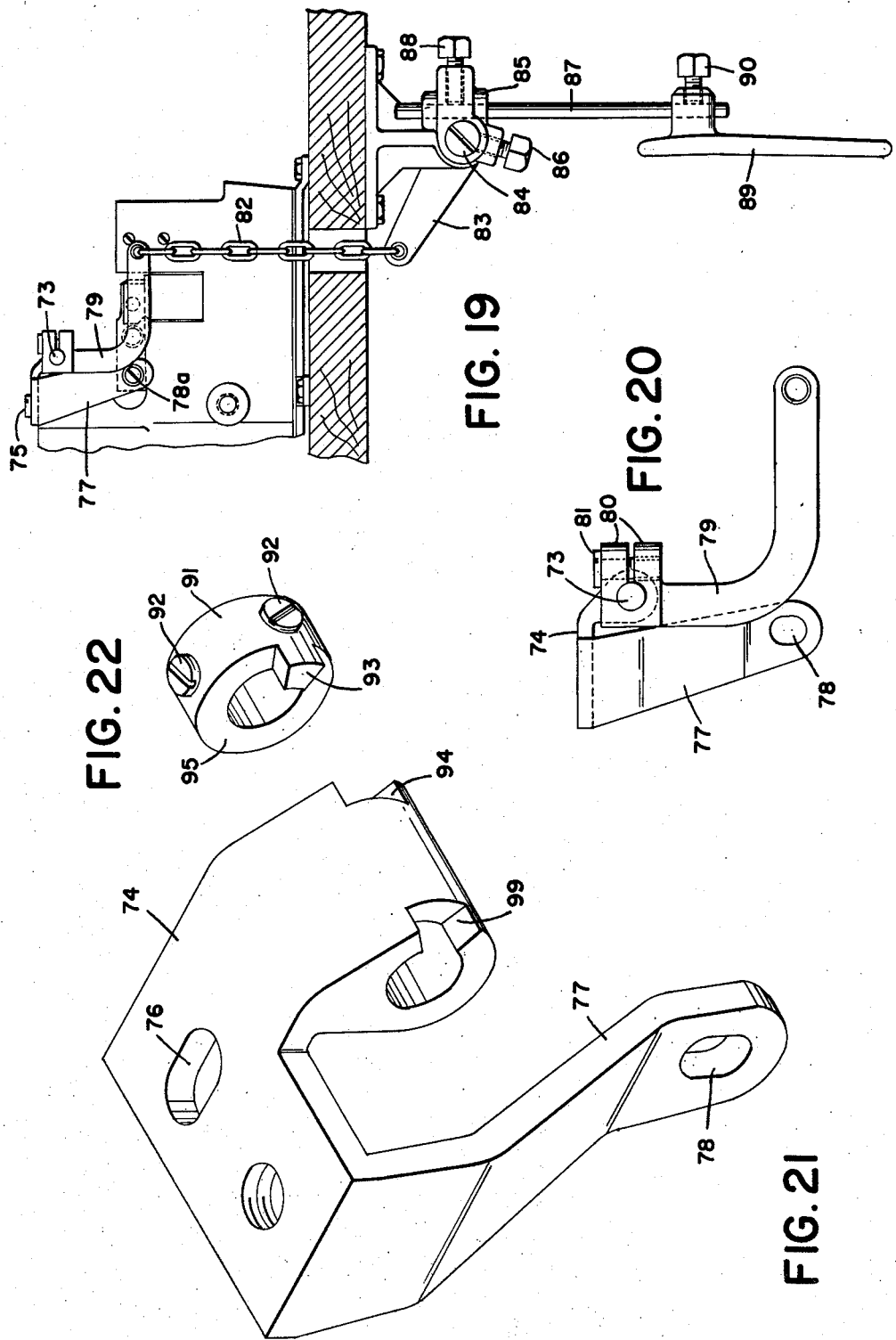

United States Patent Office 3,125,048
Patented Mar. 17, 1964

3,125,048
ADJUSTABLE TRIMMING MECHANISM
Richard C. Tringali, Mount Prospect, Ill., assignor to Union Special Machine Company, Chicago, Ill., a corporation of Illinois
Filed Aug. 1, 1960, Ser. No. 46,800
12 Claims. (Cl. 112—123)

This invention relates to edge trimming mechanism for sewing machines and more particularly for such machines adapted to form overedge seams over the edges of work pieces which are being fed through the machine.

An important object of the invention has been to provide a simple, compact, lightweight and reliable mechanism for trimming the edge of work as it is fed to overedge seaming devices which mechanism is readily adjustable, both while the machine is at rest and in the course of operating the machine, to vary at will the lateral distance between the line of needle penetration and the free edge to be overseamed. It is desirable, for example, to increase the specified distance, and thus increase the width of the seam, when the work being advanced is provided with a cross seam at a particular point. Also it is desirable to increase the width of the overedge seam under other conditions, as when sewing over the ends of a previously inserted tape or elastic band, or when attaching lace, particularly when the latter is of a flimsy type, or when closing the portions of garments that require reinforcement in areas subjected to more than the normal amount of stress. The extent to which the overedge seam should be increased varies with the particular problem involved. Also it may be desired to vary the normal width of the overedge seam for which the machine is set. The present invention provides simple and reliable means for taking care of all of these requirements.

Another important object of the invention has been to provide simple, lightweight and reliable means for automatically shifting a stitch tongue carried by the presser foot of the machine in order to insure proper formation of the overedge seam in its different widths.

A quite conventional width for an overedge seam desired for a variety of types of work is $3/32$ of an inch. This means that the cutting line formed by the trimmer mechanism is spaced laterally $3/32$ of an inch from the line of needle penetration. The adjustable trimmer in accordance with the present invention may, by way of example, be arranged to increase the overedge seam width to any desired extent, up to around $3/16$ of an inch. To accomplish this the trimmer blades are arranged to be shifted to an extent up to $3/32$ of an inch further away from the line of needle penetration than is provided by the normal setting of the machine. The mechanism in accordance with the invention may be so constructed and arranged that the overedge seam normally formed is greater or less than $3/32$ of an inch and the increase in the width of the seam may be greater than $3/32$ of an inch, if desired. In most cases, however, the increase in width desired will be only about $1/32$ of an inch so that the means provided by the invention for accurately controlling the extent of increase in width of the seam up to the maximum permitted by the construction will take care of all of the normal requirements. Moreover, the arrangement is such that whenever desired the seam width may be made to remain constantly at the value for which the machine is set in spite of any accidental engagement of the knee press or treadle operated means which normally serves to increase the width of the seam to a desired extent.

An important feature of the invention is the particular mode of mounting the movable trimmer blade and its supporting and operating means which insures accurate control over the normal seam width and also the increase in seam width which results from the operation of a knee press or treadle or some manually operated member. Toward this end the top trimmer blade is secured to an arm carried by a shaft which is adapted to be rocked by suitable connections from the main drive shaft of the machine and is adapted to be shifted axially to vary the lateral displacement of the trimmer blade in relation to the line of needle penetration. Said connections from the main drive shaft to the specified rock shaft are enclosed within a lubricant retaining housing and thus subjected to proper lubrication by the lubricant mist created within the housing. The axial shifting of the shaft which carries the trimmer blade arm is brought about through the rocking of another shaft disposed transversely of the one carrying the trimmer blade arm. This second shaft is provided with circumferentially adjustable stops which determine its normal position and also the extreme position into which it may be rocked by a suitable connection from a knee press or the like. These adjustable stops may, if desired, be clamped in positions which will prevent any rocking movement of the control shaft. Also they may be adjusted, within the limits of the construction, to predetermine any desired normal overseam width and any desired increase in such width in response to operation of a knee press member, or the like.

Another feature of the invention is the provision of a rock arm carried by the control shaft mentioned above, this rock arm being adapted to engage and shift the cutter arm carrying shaft axially in response to rocking of the control shaft. Spring means is provided for normally urging the cutter arm carrying shaft into one extreme position which corresponds with the normal stitch width for which the machine is set. The rock arm mentioned serves to shift the cutter arm carrying shaft in opposition to the action of the spring to the extent determined by one of the adjustable stop elements carried by the control shaft.

For insuring proper cooperation of the upper cutter blade with the lower cutter blade and for substantially eliminating vibrations incident to the high speed operation of the trimmer mechanism, which may be say 6,000 cycles per minute or more, there is provided a spring urged guide member arranged to cooperate with the forward end of the blade carrying arm adjacent the point at which the cutter blade is mounted thereon. The lower cutter blade is spring urged in the opposite direction into cooperation with the upper trimmer blade, but the spring means for this purpose is adapted to exert a smaller force than the two springs tending to urge the upper trimmer blade carrying arm laterally toward the lower cutter. Also, the spring which urges the lower blade carrier toward the right is opposed by a weaker spring in the lower blade assembly which urges the carrier toward the left. This weaker spring serves to offset any tendency of the spring acting on the guide member for the upper blade arm to cause binding of the lower blade carrier in its bearing means.

A specific, desirable feature of the spring-urged guide means provided for the forward end of the upper trimmer blade carrying arm is that it comprises a guide block having a hollow cylindrical stem cooperating with an opening in the frame of the machine, a spring being confined partially within the opening in the frame and partially within the interior of the stem. Rotation of the guide block is prevented by a thread guiding tube, which extends vertically through the block, cooperating with an adjustable bracket carried by the machine frame. This arrangement serves to prevent rotation of the guide block in any of its lateral positions determined by the adjustment of the trimming mechanism, without causing any binding of the stem of the block in the opening in the frame. The tube in question is the one which carries the thread to the overedge looper.

Another feature of the invention is the provision of a simple sliding connection between a pin, carried by an arm secured to the rock shaft which carries the upper blade carrying arm, and the outer end of a pitman which serves to drive the rock shaft from a crank provided in the main drive shaft of the machine. This eliminates the need for spherical bearings at the two ends of the pitman mentioned, thus simplifying the construction.

The shiftable stitch finger carried by the presser foot, in accordance with one of the foregoing purposes of the invention, is of very simple but reliable construction. It involves a lightweight member integral with the stitch finger which is normally urged laterally toward the upper trimmer blade carrying arm. It cooperates with a surface on that arm, or on a member secured to the arm, so as to maintain the stitch finger in a predetermined relation to the upper trimmer blade. The arrangement is such that the adjustable stitch finger carried by the presser foot will always be in substantital alignment with the edge of the trimmed work to be stitched while the cooperating stitch tongue carried by the throat plate of the machine is constantly maintained in the region of needle penetration. This insures proper formation of the overedge seam and prevents pulling the trimmed edge of the work inwardly, regardless of any increase or decrease in the width of the seam.

With the foregoing purposes, advantages and features of the invention in view, an illustrative embodiment of the invention will now be described in connection with the accompanying drawings, in which FIG. 1 is an elevational view of the sewing machine as seen from the left of the operator;

FIG. 3 is a perspective view of an adjustable guide element provided in connection with the illustrative machine;

FIG. 4 is a plan view of the presser foot assembly of the machine;

FIG. 5 is a side elevational view of the presser foot assembly;

FIG. 6 is a perspective view of an uncurler member mounted on the presser foot;

FIG. 7 is a transverse sectional view through the presser foot assembly taken along the line 7—7 of FIG. 4;

FIG. 8 is a perspective view of an element shown in cross-section in FIG. 7;

FIG. 9 is a perspective view of the stitch finger carrying member mounted on the presser foot;

FIG. 10 is a plan view of certain of the mechanism in the region of stitch formation, including the presser foot and the upper trimmer blade;

FIG. 11 is a perspective view of the throat plate of the machine;

FIG. 12 is an exploded perspective view of the parts which are assembled to form the top trimmer blade, its carrying arm and operating rock shaft;

FIG. 13 is a front elevational view of the trimmer mechanism and the adjacent supporting structure, with certain of the stitch forming devices indicated;

FIG. 14 is a side elevational view of the lower trimmer blade, its supporting means and the throat plate as viewed along the line 14—14 of FIG. 13;

FIG. 15 is an exploded perspective view of various parts of the lower trimmer blade carrying means;

FIG. 15a is a cross-sectional view through one of the elements shown in FIG. 15, taken along the line 15a—15a of FIG. 15;

FIG. 16 is a view partly in plan and partly in horizontal section showing the upper and lower trimmer blade carrying members, the means for shifting the upper trimmer blade and the connections from the main drive shaft for operating the upper trimmer blade;

FIG. 17 is a detail view in elevational taken along the line 17—17 of FIG. 16;

FIG. 18 is a view partly in elevation and partly in vertical section, taken along the broken line 18—18 of FIG. 16;

FIG. 19 is an elevational view of the work supporting portion of the machine, taken from the rear of the machine, showing a portion of the supporting table in section and showing knee press means for shifting the adjustable trimmer mechanism;

FIG. 20 is a detail view, in elevation, showing a bracket carrying a control shaft for the positioning of the upper trimmer blade arm and showing an arm through which the control shaft is rocked;

FIG. 21 is a perspective view of the bracket member shown in FIG. 20; and

FIG. 22 is a perspective view of an adjustable stop member carried by the control shaft.

The illustrative machine is of the general character of the overedge sewing machine disclosed in Wallenberg et al. patent, No. 2,704,042, granted March 15, 1955. The work feeding and stitch forming devices embodied in the illustrative machine may be of the character disclosed in said Wallenberg et al. patent. Also the presser foot carrying means may be of the character disclosed in said patent, and in general the operating connections for the various devices embodied in the illustrative machine may be similar to those disclosed in said Wallenberg et al. patent.

Figure 1:
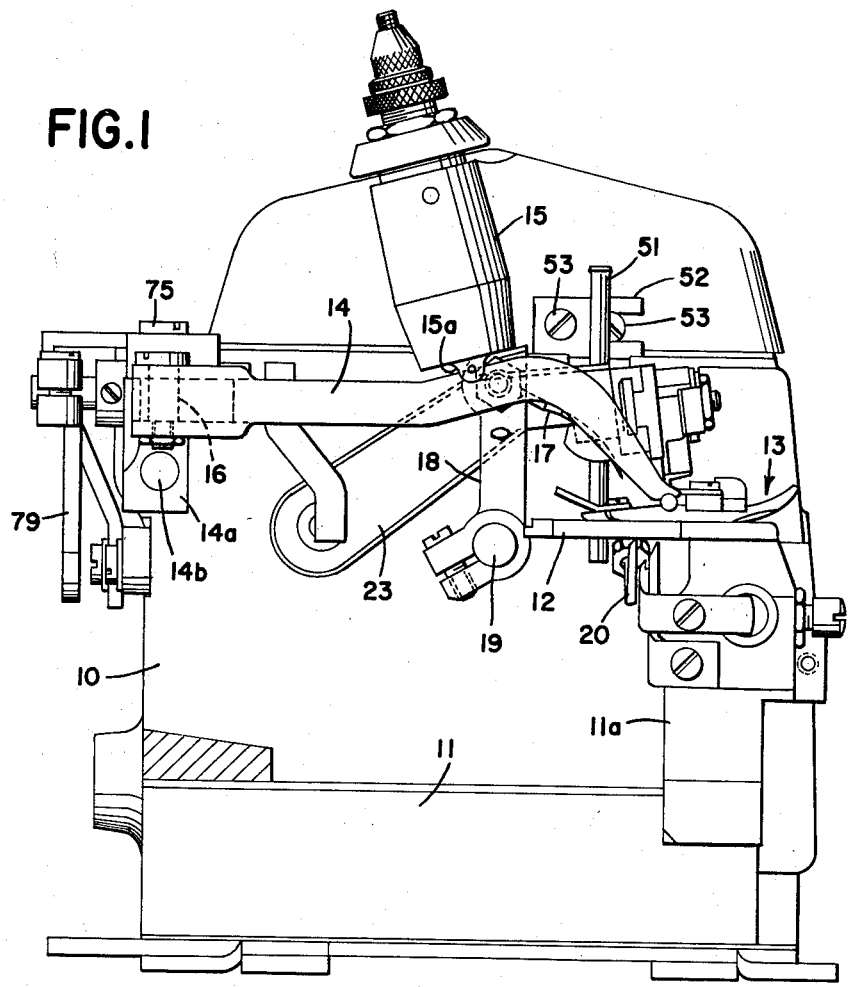

Turning now to the drawings, the machine has a main frame 10 which is largely enclosed and capable of retaining a lubricant for delivery of a lubricant mist to most of the relatively sliding surfaces of the operated devices of the machine. The lower portion of the frame has a horizontal extension 11 (FIGS. 1, 10, 15 and 16) arranged to carry various devices in the region of stitch formation. A vertically extending block or standard 11a carried by portion 11 of the frame has at its top a throat plate 12 over which the work is advanced in the course of stitch formation. A presser foot 13 engages the upper surface of the work and holds it against the throat plate and the usual work feeding mechanism (not shown) which comprises differential feed dogs of the character disclosed in said Wallenberg et al. patent. The presser foot 13 is detachably connected with the outer end of an arm or bar 14 mounted on a member 14a adapted to rock about the axis of a rock shaft 14b. The arm or bar 14 is urged downwardly to press the foot 13 against the work by means of a spring-urged plunger slidably mounted in a head 15 extending outwardly from the main frame of the machine. The head 15 may be angularly disposed, as shown in FIG. 1, or may be vertically disposed as shown in said Wallenberg et al. patent. The lower end 15a of the plunger is forked to straddle the bar 14 but may be lifted out of engagement therewith to permit the bar to be swung outwardly about the axis of a bolt 16, by which the bar is secured to the member 14a, and thus carry the presser foot away from the top of the throat plate.

Suitable stitch forming devices include a curved needle 17 carried by an arm 18 secured to a rock shaft 19 (FIG. 1). They also include an underlooper 20 and an overedge looper 21 (FIG. 13) of the general character disclosed in said Wallenberg et al. patent that are driven from a main drive shaft 22 (FIG. 16) which is provided with various crank portions arranged to operate the driving mechanisms for the work feeding and stitch forming devices.

The edge trimming mechanism, with which the invention is primarily concerned, comprises an upper blade carrying arm 23 (FIGS. 1, 2, 12 and 16) which is secured to a rock shaft 24 journaled for rocking movement in suitable bearing sleeves carried by the frame of the machine. The shaft 24 is also capable of being shifted axially. As best shown in FIG. 12, the forward end of arm 23 is provided with a laterally extending head 25 arranged to carry a plate 26 having a rearwardly extending rib arranged to slide in a groove provided in the head 25. Plate 26 has a diagonally disposed groove 27 in its front face arranged to receive a cutter blade 28. Forwardly of this blade is a clamping member 29 and forwardly of the latter is a thread chain guard 30. The plate 26, blade 28, clamp member 29 and chain guard 30 are secured to the head 25 of arm 23 by means of a screw 31 and a nut 33. The screw 31 has an enlarged head arranged to slide in a channel 32 provided in the head 25. The shank of the screw extends through openings in the plate 26, clamp member 29 and chain guard 30 to receive the nut 33 at its outer end. A small screw 34 passing through a small opening in the plate 26, and having threaded engagement with an opening 35 in the head of screw 31, serves further to secure the plate 26 to the head 25. This arrangement is such that the blade 28 may be readily removed for sharpening or replacement without disconnecting the plate 26 from the head 25. It will be apparent that the plate 26 may be adjusted laterally of the head 25 to a certain extent by sliding the head of the screw 31 in the channel 32. Also the blade 28 may be adjusted in relation to the plate 26 in order to present the cutting edge of the blade in the desired position.

Shaft 24 is surrounded by a spring 36 (FIGS. 16 and 18) which at one end engages a collar 37 secured to the shaft and at its other end engages a washer 38 which is urged by the spring against the adjacent end of a bushing 39 forming one of the bearings for the shaft 24. Secured to the shaft 24 adjacent its right end (FIG. 16) is an arm 40 the upper end of which is forked and may be clamped upon the shaft by means of a bolt 41. At its lower end the arm 40 has a laterally extending pin 42 arranged to slidingly receive a collar or head 43 at the free end of a pitman 44. This pitman at its opposite end has a two part strap construction which includes a cap 45 bolted to a portion 46 integral with the pitman. The strap surrounds a crank portion of the shaft 22 which, upon rotation of the shaft, serves to shift the pitman and rock the shaft 24 through a suitable angle to move the upper cutter blade 28 through its trimming stroke. These operating connections for driving the rock shaft 24 are all within the enclosed lubricant housing of the frame 10.

To guide the forward end of the upper trimmer blade carrying arm 23 and thus insure its proper cooperation with the lower trimmer blade and eliminate objectionable vibrations, a guide block 47 is provided. This block has a cylindrical stem 48 slidably mounted in a cylindrical recess in the frame 10. The stem 48 is hollow and receives a spring 49 the opposite end of which abuts against the wall at the end of the recess. Thus spring 49 urges the guide block 47 against a surface 50 adjacent the free or forward end of the arm 23. To prevent turning of the block 47, a thread guiding tube 51 which extends vertically through the block cooperates with a bracket 52 (FIG. 3) which is secured by screws 53 (FIGS. 1 and 2) to the frame of the machine. Laterally extending fingers 52a of the bracket 52 receive between them the tube 51 and thus prevent rotation of the guide block 47.

The upper trimmer blade 28 cooperates with a lower trimmer blade 54 (FIGS. 13 and 14). This lower trimmer blade is adjustably mounted in a groove provided in a head 55 (see also FIG. 15). A plate 56 and screw 57 serve to clamp the blade 54 in the head 55 in a position for proper cooperation with the upper blade. Head 55 has a laterally extending tubular member 58 having a slot or opening 58a extending through its wall axially of the tube for a suitable distance inwardly from its free end. A spring 59 (FIGS. 15 and 16) is fitted within the tubular member 58 and is held under compression therein by means of a laterally extending arm of a rear needle guard 60 secured by a screw 61 to the block 11a which, as explained, is secured to the base 11 of the main frame of the machine. Spring 59 urges the lower blade carrying head 55 toward the right (FIG. 16) and thus urges the blade 54 against the upper blade 28. If desired, the head 55 and its tubular extension 58 may be locked against movement by the spring 59 by tightening a set screw 63. To balance the various spring forces acting on the two trimmer blade carriers and eliminate any tendency toward setting up binding forces between the tubular member 58 and its bearing in the block 11a, the latter is provided with a forward extension 64 having a screw threaded opening arranged to receive the end of a screw threaded pin 65. A spring 66 surrounding the pin 65 and in turn surrounded by a sleeve 67 is held under suitable compression between the head of the pin 65 and an inwardly extending flange of the member 67. The latter is urged by the spring against the outer face of the head 55. Also surrounding the pin 65 is a sleeve 68 having an outwardly extending flange 69 normally held in engagement with the extension 64. The sleeve 68 passes through an opening 70 in the head 55. The arrangement is such that when the spring 59 urges the lower trimmer blade carrying head 55 toward the right, this will tend to compress somewhat further the spring 66, and the member 68 may be shifted slightly toward the right with the head 55 or this head may slide upon the shank of the member 68.

Figure 2:
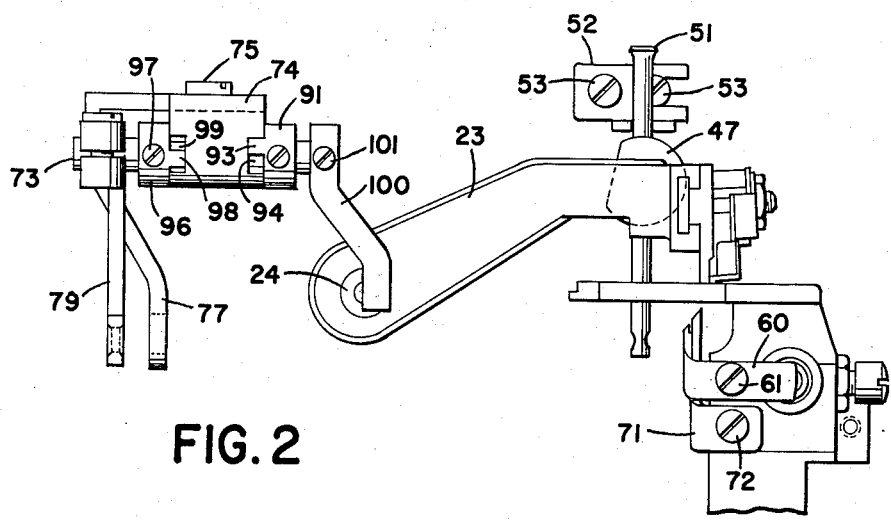
FIG. 2 is an elevational view of certain of the mechanism shown in FIG. 1, taken from the same direction as FIG. 1.

A forward needle guard 71 is mounted on the block 11a by means of a screw 72 (FIG. 2). It will be understood that in the swinging of the needle carrying arm 18 the needle 17 will be carried downwardly between the two needle guards 60 and 71 and thus prevent deflection of the needle and insure its proper cooperation with the loopers in stitch formation.

The means for shifting the upper trimmer blade toward the right, and thus permitting the lower trimmer blade to shift correspondingly to the right under the action of spring 59 will now be described. This mechanism comprises a rock shaft 73 (FIG. 2) journaled in a bracket member 74 secured to the frame of the machine by means of a screw 75 cooperating with an opening 76 on the bracket member and with a threaded opening in the frame. Bracket 74 is further secured in proper position on the frame by means of a downwardly extending arm 77 of the bracket having an opening 78 with which cooperates a screw 78a (FIG. 19) having threaded engagement with a portion of the frame. Secured to the shaft 73, adjacent one end, is an L-shaped arm 79 (FIGS. 1, 2, 19 and 20) having a split sleeve construction 80 at its upper end adapted to be clamped upon the shaft 73 by a screw 81. The outer free end of the arm 79 is adapted to be connected by a chain 82 with a knee press or treadle. As shown in FIG. 19, the chain has its lower end connected with an arm 83 secured to a rock shaft 84 carried by a bracket extending downwardly from the undersurface of the work table. Also secured to the shaft 84 is a socket member 85 which may be adjustably secured to the shaft 84 by a set screw 86. Socket member 85 receives a downwardly extending rod 87 which is clamped in the socket by a set screw 88. At its lower end the rod 87 carries a knee press member 89 secured to the rod by a set screw 90. Since FIG. 19 is a view from the rear of the machine, it will be seen that the knee press member 89 is adapted to be engaged by the left knee of the operator to rock the shaft 84 and in turn rock the shaft 73. It will be apparent that the knee press parts could be reversed, if desired, and arranged for operation by the right knee of the operator.

The rocking movement of the shaft 73 may be limited to any extent desired. Also its normal position and the position to which it is shifted by operation of the knee press may be varied to suit the requirements of any particular work to be performed. In fact, as stated above, the adjustable means for determining the two extreme angular positions of the shaft 73 may be so set as to retain the latter against any turning when it is not desired to vary the width of the seam to be formed. For determining the normal angular position of the shaft 73, there is secured to the latter a collar 91 which may be clamped to the shaft in any desired angular position by set screws 92. The collar 91 has a laterally extending projection 93 arranged to cooperate with a recess 94 in the adjacent end of the bearing portion of bracket 74. The end surface 95 of collar 91 cooperates with the adjacent surface of the bracket 74 to prevent axial movement of the shaft 73 in one direction. A similar collar 96 is secured to the shaft 73 by means of a set screw 97 on the opposite side of the bearing portion of bracket 74. A lateral projection 98 of the collar 96 cooperates with an opening 99 in the bracket 74. Adjacent the free end of the shaft 73 and near the collar 91 there is secured to the shaft an arm 100 which may be clamped to the shaft by one or more set screws 101. The lower end of arm 100 cooperates with the end of shaft 24 or an adjacent portion of the arm 23, as best shown in FIG. 18. Spring 36 surrounding the shaft 24 urges the latter toward the right (FIG. 18) and thus rocks the arm 100 and the shaft 73 into the position indicated in FIG. 2, wherein the projection 93 of collar 91 engages the upper shoulder provided by the opening 94. When the knee press 89 is operated the shaft 73 will be rocked to urge the lower end of arm 100 toward the left (FIG. 18) in opposition to the spring 36 and thus shift the location of the trimmer arm 23 and the upper trimmer blade toward the right (FIG. 16). The extent to which shaft 73 is rocked, and hence the shaft 24 is shifted, is determined by the cooperation of projection 98 of stop collar 96 with the adjacent, lower wall of the opening 99 (FIG. 2). By proper setting of the stop collars 91 and 96 the normal width of the seam to be formed may be set as desired, say 3/32 of an inch, and the width of the seam to be formed upon operation of the knee press may similarly be predetermined, up to say 3/16 of an inch.

Referring now to FIGS. 4–10, inclusive, the details of a special presser foot construction employed in connection with the invention are shown. The presser foot 13 has a work engaging sole portion 102 on which is mounted, toward its forward end, a work uncurling member 103. The latter is secured to the presser foot by a screw 104 which fits into a countersunk elongated opening 105 which permits some lateral adjustment of the uncurler member. This member serves to flatten out the edge of the work just in advance of the region in which the trimmer mechanism operates. The presser foot is secured to the forward end of the arm 14 (FIG. 10) by providing a recess 106 in the upper surface of the sole portion 102 into which fits a laterally extending pinlike element at the forward end of the arm 14. An arm 107 adapted to be turned about a pivot screw 108 is arranged to ride over the top of the pinlike element to retain the presser foot on the arm 14.

Surrounding the shank of the screw 108 is a block 109 having the configuration best shown in FIG. 8. This is received within a member 110 having an elongated laterally extending opening 111 (FIG. 9). Member 110 has a downwardly extending portion 112 the rearward end of which carries a stitch finger 113. A spring 114 interposed between the side wall of block 109 and the inner surface of the side wall of member 110 serves to urge the latter toward the right (FIG. 7). The extent to which the member 110 is urged toward the right is governed by the engagement of the wall 112 with the adjacent end of the top trimmer blade 28 or the rearwardly extending finger of the chain guard 30. The wall 112 is at all times held in engagement with one or another of these members. Thus, as the trimmer arm 23 is shifted toward the right, the member 110 will be correspondingly shifted toward the right and will present the stitch tongue 113 along the edge of the work being stitched or slightly to the right of said edge (FIG. 10). The throat plate 12 (FIG. 11) has a stitch tongue 115 which extends rearwardly in a region close to the line of needle penetration of the work, the needle passing through the opening 116. By having the stitch finger 113 on the presser foot always disposed close to the trimmed edge of the work, uniformity of stitch formation is insured. Thus the stitch finger 113 prevents the overedge threads from pulling the free edge of the work inwardly as the stitches are tightened and the stitch tongue 115 on the throat plate prevents drawing of the threads laterally toward the free edge of the work as the stitches are tightened. The edge trimming mechanism operates in the region 117 of the throat plate while the feed dogs operate through the openings 118 and 119.

As will be seen from the foregoing, the present invention provides a very simple, positive and effective means for positioning the edge trimming mechanism of a high speed sewing machine so as to insure the desired width of overedge seaming, both for a pre-selected normal operation and a desired variation from the normal. It also prevents accidental variation from the desired normal seam width when it is predetermined that no variation in seam width should be undertaken. This is all accomplished without adding to the weight of the parts which must be oscillated to effect the trimming action. Moreover, means is provided for insuring uniform stitch formation and the prevention of distortion of the seam as the required take-up action is applied to the several threads entering into the overedge stitching.

While a preferred embodiment of the invention has been described in detail, it will be understood that various changes may be made in the construction and correlation of certain parts of the mechanism within the scope of the appended claims.

What is claimed is:

1. In an overedge sewing machine having stitch forming devices including a needle adapted to penetrate the work to be stitched and having edge trimming mechanism for trimming the edge of the work along a line spaced from the line of needle penetration, said edge trimming mechanism comprising a rockable arm carrying a movable trimmer blade, means carrying another trimmer blade ccooperating with said movable trimmer blade to trim the edge of the work, a rock shaft to which said rockable arm is secured, said shaft being shiftable axially, spring means axially aligned with said shaft normally urging said shaft in one direction into a predetermined axial position, and means comprising a rock arm arranged to engage one end of said shaft to shift the latter axially in opposition to said spring means.

2. In an overedge sewing machine of the character set forth in claim 1, said rock arm being secured to a second rock shaft at right angles to said first-mentioned rock shaft, and means secured to said second rock shaft for predetermining the extent of angular movement thereof in each direction.

3. In an overedge sewing machine of the character set forth in claim 2, said means secured to said second rock shaft being collars which are angularly adjustable in relation to said second rock shaft to vary the extent of angular movement which may be imparted thereto.

4. In an overedge sewing machine of the character set forth in claim 3, a bracket providing bearing means for said second rock shaft, said collars secured to said second rock shaft having means coacting with surfaces on said bracket and being adapted, upon angular adjustment of said collars, to predetermine the normal and axially shifted positions of said first-mentioned rock shaft.

5. In an overedge sewing machine of the character set forth in claim 1, said spring means surrounding said rock shaft, and a spring urged guide member cooperating with said rockable arm at a point remote from its point of securement to said rock shaft.

6. In an overedge sewing machine of the character set forth in claim 5, said guide member having a cylindrical shank and being spring urged in the same direction as said rock shaft is urged by said spring means, a fixed bracket, and means carried by said guide member cooperating with said bracket to prevent turning of said guide member.

7. In an overedge sewing machine of the character set forth in claim 1, a main drive shaft, and direct connections from said main drive shaft to said rock shaft for rocking the latter, said connections including members which are freely slidable relative to each other upon axial shifting of said rock shaft.

8. In an overedge sewing machine of the character set forth in claim 7, said connections from said main drive shaft to said rock shaft, including said relatively slidable members, being disposed within an enclosed lubricant retaining housing.

9. In an overedge sewing machine of the character set forth in claim 1, a presser foot cooperating with the work to be stitched, means carried by said presser foot spring urged into engagement with said movable trimmer blade, and means carried by said last-mentioned means forming a stitch finger disposed adjacent the line of trimming of the work.

10. In an overedge sewing machine having a work support, stitch forming mechanism arranged to form an overedge line of stitching in work carried by said work support, an edge trimming mechanism arranged to trim the edge of the work at selectable predetermined positions in relation to the line of stitch formation, a presser foot arranged to retain the work against the work support, means carried by said presser foot carrying a stitch finger, and spring means for urging said stitch finger transversely of said presser foot into a position in a predetermined relation to the trimmed edge of the work by cooperation of a surface on said stitch finger carrying means with a surface on said edge trimming mechanism.

11. In an overedge sewing machine of the character set forth in claim 10, said stitch forming mechanism comprising a needle adapted to pass through the work along a predetermined line inwardly of the edge of the work, and said work support having a stitch tongue positioned adjacent the line along which said needle passes through the work, said stitch tongue on said work support and said stitch finger carried by said presser foot thus serving to retain the line of stitching along both edges of the same for varying widths of the overedge seam determined by the positioning of the edge trimming mechanism.

12. In an overedge sewing machine of the character set forth in claim 10, said means carried by said presser foot comprising a slide member having an elongated opening the major dimension of which extends transversely of said presser foot, a guide member secured to said presser foot within said elongated opening, said spring means coacting between a surface on said guide and another surface on said slide member for urging said stitch finger carried by said member into the position specified.

References Cited in the file of this patent
UNITED STATES PATENTS

| | | |
|---|---|---|
| 719,552 | Arnold | Feb. 3, 1903 |
| 2,010,216 | Brussell | Aug. 6, 1935 |
| 2,238,796 | Knaus | Apr. 15, 1941 |
| 2,293,607 | Knaus et al. | Aug. 18, 1942 |
| 2,427,609 | Knaus | Sept. 16, 1947 |
| 2,825,294 | Pierce | Mar. 4, 1958 |
| 2,868,147 | Wood | Jan. 13, 1959 |